Inventors
R. J. Morgan
Robert N. Shilling, Jr
By
Attorney

United States Patent Office 3,546,555
Patented Dec. 8, 1970

3,546,555
MOTOR SPEED CONTROL
R John Morgan and Robert Nelson Shilling, Jr., Fort Collins, Colo., assignors to Scintillonics, Inc., Fort Collins, Colo., a corporation of Colorado
Filed Apr. 17, 1968, Ser. N. 722,110
Int. Cl. H02p 5/16
U.S. Cl. 318—341                      17 Claims

ABSTRACT OF THE DISCLOSURE

The speed of a unidirectional-current motor is controlled by governing the duration of pulsations of its supply of rectified alternating current. That duration is established by control pulses developed by an astable multi-vibrator, the timing of which is selectively adjustable to vary the control-pulse width. However, the multi-vibrator by itself effects interruption of the motor current only within a finite time period. That time period is reduced by effectively shorting out each control-pulse upon the occurrence of each interruption; this is achieved by use of a pseudomonostable multi-vibrator activated upon occurrence of the interruption and which is self-deactivating prior to the next occurrence. The arrangements are such as to achieve compensation for line voltage changes and otherwise to act in a manner maintaining constant the motor speed at a selectively adjustable value.

---

The present invention pertains to control apparatus. It particularly relates to a system for adjustably controlling the speed of an electric motor.

Numerous systems are known for effecting motor speed control. Of particular difficulty is the control of a unidirectional-current electric motor so as to run at an adjustable value of constant speed. It is generally known to control the level of power supplied to a load by pulsating that power and adjusting the time of beginning or end of the pulses in order to control the average power delivered to the load. However, many such approaches suffer disability by reason of variations in speed upon the occurrence of line voltage changes, courseness of control adjustment, lack of precision in the maintenance of a constant value of selected pulse width or inability to effect a sufficiently small minimum pulse width for slowest-speed operation.

It is, accordingly, a general object of the present invention to provide new and improved control apparatus generally of the foregoing character but which overcomes one or more of the above-noted difficulties and deficiencies.

It is another object of the present invention to provide new and improved control apparatus of the kind which governs the width of pulses of power supplied to a load and in which the characteristics of those pulses are accurately determinable and maintainable.

A specific object of the present invention is to provide control apparatus of the foregoing character in which the turn-off time of such control pulses is minimized.

In accordance with the present invention, control apparatus includes a load, a source of power for the load and means coupled to that source for supplying the power to the load. The latter includes means for repetitively interrupting the supply of the power for selectively-adjustable time intervals, with the interrupting means, upon the occurrence of each interruption, being effective to reduce the supply of power only throughout a finite period of time. Finally, the apparatus includes means, coupled to the interrupting means, responsive to each interruption of the power by that interruption means for decreasing the length of the aforesaid finite period of time.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figure 1:
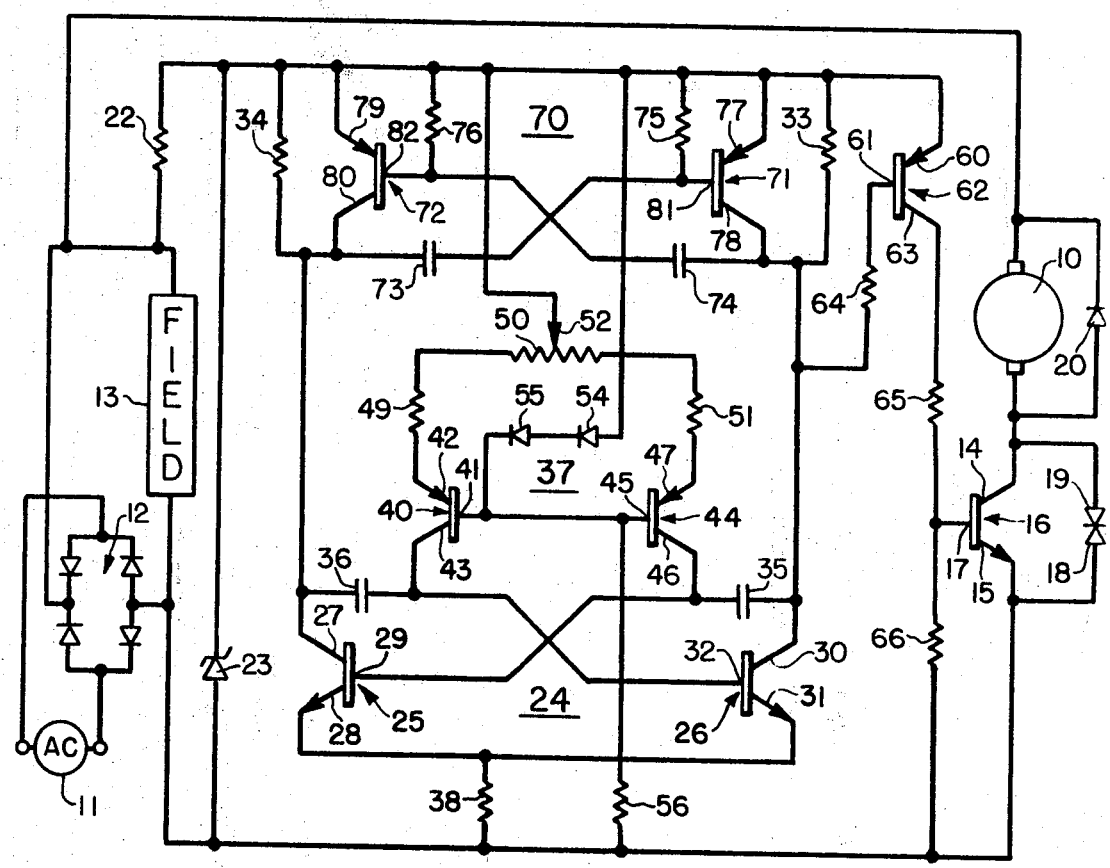
FIG. 1 is a schematic diagram of one embodiment of the present invention.

The principles on which the present invention are based are particularly suited and advantageously adapted to the control of the speed of a undirectional-current motor. Consequently, the circuitry in FIG. 1 is directed specifically to that embodiment. Thus, a unidirectional-current motor 10 is supplied with power from an alternating current source 11 by means of the intervening circuitry in a manner to permit control of the speed of motor 10. Attention will first be given to a description of the circuitry itself, after which the nature of its operation will be explained together with discussion of its salient features.

Coupled across source 11 are the input terminals of a bridge rectifier 12 having its otuput terminals coupled to and supplying the energization of the field winding 13 on motor 10. Motor 10 also is coupled across the output terminals of bridge rectifier 12, one side of the motor being coupled to one bridge terminal directly and the other side of motor 10 being connected to the other bridge terminal through the collector 14 and emitter 15 of an NPN transistor 16. The latter serves as a gate valve to pass or stop the flow of the fullwave-rectified alternating-current from bridge 12 to motor 10. With respect to transistor 16 as well as to the additional transistors in the circuit to be further described, each may be defined and thought of as a valve controlling or governing the flow of electric current. In this case, that control is effected by the application of a control pulse to base 17 of transistor 16. A pair of diodes 18 and 19 connected back-to-back in series across collector 14 and emitter 15 exhibit thresholds slightly above the highest potential normally appearing at those transistor electrodes in order to provide over-voltage protection. A so-called free-wheeling diode 20 is connected across the armature terminals of motor 10 in a conventional manner.

Connected in series with a resistor 22 between the output terminals of bridge 12 is a Zener diode 23, resistor 22 constituting a series-limiting impedance for diode 23. Also energized from the output of bridge 12 and controlled in energization level by Zener diode 23 is an astable multi-vibrator 24. Multi-vibrator 24 includes a pair of NPN transistors 25 and 26 respectively having a collector 27, an emitter 28 and a base 29, and a collector 30, an emitter 31 and a base 32. Completing the multi-vibrator are discharge resistors 33 and 34 and capacitors 35 and 36 together with a constant-current source 37. More specifically, connected across Zener diode 23 is a first series combination of a dividing resistor 38, emitter 28, collector 27 and resistor 34. Similarly connected across diode 23 is another series combination including resistor 38, emitter 31, collector 30 and resistor 33. Capacitor 36 connects collector 27 to base 32, and capacitor 35 connects collector 30 to base 29.

Constant-current source 37 includes a PNP transistor 40 having a base 41, an emitter 42 and a collector 43, together with another PNP transistor 44 having its base 45, collector 46 and emitter 47. Emitter 42 is coupled to emitter 47 through the series combination of a resistor 49, a potentiometer 50 and another resistor 51. Potentiometer 50 has an adjustable tap 52 connected to the same side of diode 23 as are resistors 33 and 34. Bases 41 and 45 are connected together and are coupled through a pair omter 50 has an adjustable tap 52 connected to the same side of diode 23 to which resistors 33 and 34 are connected. Bases 41 and 45 are further coupled to the other side of diode 23 through a resistor 56. Thus, resistor 56 together with diodes 54 and 55 constitute a voltage divider to an intermediate point of which bases 41 and 45 are connected. Diodes 54 and 55 function to provide a constant reference voltage to which the bases are biased; these diodes in themselves are forward biased, each in this case exhibiting a potential drop of 0.6 volt so that the two together appear to the bases as constituting a battery having a potential of 1.2 volts.

Connected across discharge resistor 33 are the emitter 60 and, through a resistor 64, the base 61 of a PNP transistor 62. The collector 63 of transistor 62 is connected through a voltage divider, composed of resistors 65 and 66, to the side of diode 23 opposite that of its connection to resistor 33. The point between resistors 66 and 65 is connected to base 17 of transistor 16.

As a final unit of principal interest in the apparatus combination in FIG. 1, the circuitry includes a pseudomonostable multi-vibrator 70 including PNP transistors 71 and 72, capacitors 73 and 74 and discharge resistors 75 and 76. Emitter 77 of transistor 71 is connected to the end of resistor 33 also connected to diode 23, while collector 78 of that transistor is connected to the other end of resistor 33. Similarly, emitter 79 of transistor 72 is connected to the end of resistor 34 also connected to diode 23, while collector 80 of that transistor is connected to the other end of resistor 34. Resistor 75 is connected between emitter 77 and the base 81 of transistor 71, while resistor 76 is connected between emitter 79 and the base 82 of transistor 72. Completing this combination, capacitor 73 is connected between collector 80 and base 81, while capacitor 74 is connected between collector 78 and base 82.

Figure 2:
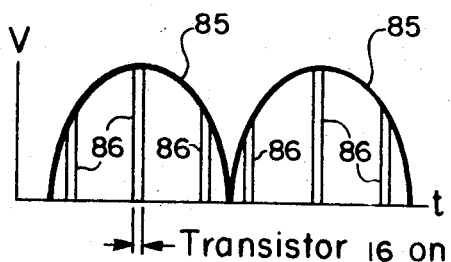
FIG. 2 is a plot of current supplied in a portion of the circuit of FIG. 1.

FIG. 2 represents the current supplied motor 10 under the control of transistor 16. More specifically, the rectified alternating current available from bridge rectifier 12 has a waveform as defined by curve 85 and composed of a succession of sinusoidally-shaped half-cycles of the original alternating current waveform with all such half-cycles having the same polarity. Also shown in FIG. 2 are a series of pulses 86 which represent the current actually passed by transistor 16 to motor 10. These pulses have an amplitude determined by the instantaneous amplitude of waveform 85, a width determined by the time during which transistor 16 is turned on and successive spacing one from the next as determined by the length of the time interval during which transistor 16 is turned off. Thus, either a decrease in the length of that latter time interval or an increase in the pulse width corresponds to an increase of the current supplied to motor 10 with a resulting increase of its speed.

Figure 3:
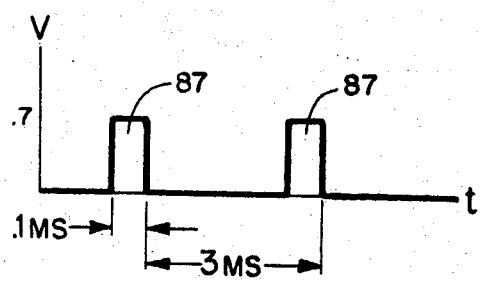
FIGS. 3 and 4 are plots of control characteristics of a portion of the circuitry in FIG. 1.
Figure 4:
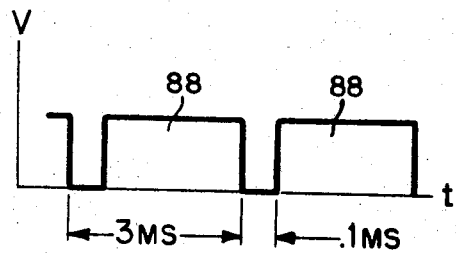

On the other hand, FIGS. 3 and 4 are plots of the pulses of potential developed during operation across discharge resistor 33. Thus, the duration of control pulses 87 in FIG. 3 is considerably less than the duration of control pulses 88 in FIG. 4. Correspondingly, the time interval between pulses 87 is proportionally greater than the time interval between pulses 88. However, the mean frequency, or the frequency of initiation of the pulses in each of FIGS. 3 and 4, is the same.

As such, the operation of multi-vibrator 24 is conventional and well known. Transistor 26 drives transistor 25 through capacitor 35 and transistor 25 drives transistor 26 through capacitor 36. Capacitor 35 discharges through discharge resistor 33 when transistor 26 is cut off and is charged through transistor 44 with a constant current. Similarly, capacitor 36 discharges through resistor 34 when transistor 25 is cut off and is charged through transistor 40 with a constant current. When transistor 26 begins to conduct, it drives transistor 25 which in turn drives transistor 26 until the potential level developed on capacitor 36 increases to a value at which transistor 26 is cut off; transistor 25 then continues to conduct and the potential on capacitor 36 begins to decrease. Subsequently, transistor 26 again begins to conduct under the drive from transistor 25 and that situation continues until the potential across capacitor 35 reaches a value at which transistor 25 is cut off. Thus, first one of the transistors and then the other is caused to change from a conductive to a non-conductive state. The charging times of capacitors 35 and 36 determine the time interval it takes to cut off the respective transistors. That time interval in turn is selectively adjustable by means of tap 52 of potentiometer 50. Moving the potentiometer to the left in FIG. 1 decreases the charging-circuit resistance for capacitor 36 and hence decreases the time it takes to develop the potential necessary to cut off transistor 25 during operation. At the same time, the charging-circuit resistance for capacitor 35 is increased so that it takes a longer time to charge and transistor 26 remains conducting for a longer period of time. The end result is the development across resistor 33 of a series of pulses which terminate each time transistor 26 is cut off with a typical RC time-constant decay curve. The duration of those pulses, or their pulse length, is selectively adjustable by moving the tap on potentiometer 50. Increasing the pulse width decreases the time interval between the pulses developed across resistor 33.

The pulses developed across resistor 33 are amplified by transistor 62 and fed to base 17 of control transistor 16 where, being negative-going at both bases 61 and 17, they turn on transistor 16 and thereby enable the conduction of current through the armature of motor 10. Thus, an increase in the width of the pulses developed across resistor 33 effects a decrease in the time interval during which transistor 16 is cut off and the current to motor 10 is interrupted. On the other hand, decreasing the width of the pulses developed on resistor 33 increases the interruption time interval. However, the maximum interruption time interval, without more, is limited by the finite period it takes the pulse developed on resistor 33 to decay.

In order to decrease, and essentially eliminate, that latter decay-time period, multi-vibrator 70 is included to short out resistor 33 essentially immediately following the switching of transistor 26 to a non-conducting condition. To this end, multi-vibrator 70 is slaved to multi-vibrator 24 so that, when transistor 25 becomes conductive as transistor 26 becomes non-conductive, transistor 71 at the same time becomes conductive and thereby shorts out resistor 33. More particularly, when transistor 25 becomes conductive, a pulse is developed across resistor 34 which, through capacitor 73, drives base 81 of transistor 71 in a direction causing the latter to conduct.

In addition, multi-vibrator 70 is caused to have a faster switching cycle than that of multi-vibrator 24 so as to be ready to again perform its function upon the beginning of the next cycle when transistor 26 becomes non-conducting. As soon as transistor 71 begins conducting, it drives transistor 72 through capacitor 74 and develops a signal which in turn is fed through capacitor 73 back to base 81 in order to cause the latter again to become non-conductive. The time constant established by capacitor 73 and resistor 75 is selected so that transistor 71 returns to a non-conductive state prior to the next conduction cycle of transistor 26. Further, the arrangement of multi-vibrator 70 is such that it remains in the status wherein transistor 71 is non-conducting until the occurrence of the next succeeding interruption of the conduction of transistor 26 and beginning of conduction through transistor 25. At that time, the quenching function of multi-vibrator 70 upon the signal developed across resistor 33 is repeated. Thus, multi-vibrator 70 is in essence monostable with stability as to the condition in which transistor 71 is non-conducting.

From the foregoing it can be seen that astable multi-vibrator 24 acts through transistors 62 and 16 to interrupt repetitively the supply of power to motor 10 for time intervals selectively adjustable by manipulation of potentiometer 50. In the timing of multi-vibrator 24, the differential between the current levels fed capacitors 35 and 36, as adjusted by potentiometer 50, governs the length of the time intervals between successive pulses developed across resistor 33. Multi-vibrator 70 responds to each interruption of the supply of motor armature power to decrease the length of the finite period of time necessary, upon each interruption occurrence, for the supply actually to be reduced or terminated.

In operation, transistor 26 constitutes an electric valve which repetitively changes between conduction and non-conduction states in correspondence with and initiating the interruptions, while capacitor 35, together with the impedance of resistor 33 and constant-current source 37, constitutes an energy-storage element that exhibits changes in storage energy level in response to changes in the conduction state of transistor 26. In turn, transistor 71 functions as another electric valve activatable in response to the occurrence of a change in the conduction state of transistor 26 to alter the effective level of the stored energy as measured across resistor 33. Further, transistor 72 responds to the alteration of that level by transistor 71 to deactivate the latter subsequent to its activation and prior to the next occurrence of the change in the conduction state of transistor 26.

It also is of interest that, when transistor 25 is conductive, capacitor 35 charges to the voltage reference value established by Zener diode 23; that same potential biases capacitor 36 leading to the beginning of conduction in transistor 26. However, when transistor 26 initiates conduction, the voltage reference across diode 23 drops to a lesser value which is a function of the available current remaining to bias the Zener diode. When the line voltage from the alternating-current source increases, the reference voltage established by diode 23 remains essentially constant but the Zener-diode shell voltage increases because more bias current is available for the diode. The consequence of these events is that, upon an increase in incoming line voltage while transistor 26 is conducting, the pulse width of the signal driving the base of control transistor 16 decreases and its off-time increases. Consequently, the arrangement depicted affords a degree of compensation for incoming line voltage variations. For a given adjustment of potentiometer 50, substantially constant motor speed ensues even though the incoming voltage, which also is applied across the motor, changes.

Adjustment of potentiometer 50 serves to change the width of the pulses developed across resistor 33. At the same time that adjustment changes in the opposite sense the time interval between pulses by a corresponding amount. As a result, the frequency of pulsation remains substantially constant as indicated in FIGS. 3 and 4. In this manner, the different segments 86, as shown in FIG. 2, contain a constant phase relationship relative to the peaks and valleys of waveform 85, so that segments 86 have constant amplitudes. Thus, a change in the width of segments 86 causes a directly-proportional change in the average motor current.

It has been demonstrated that the system of FIG. 1 is capable of stable operation while yet affording ready adjustment of the speed of motor 10 at any selected speed. Very small widths of the control pulses are available, with the same precision of control as in the case of larger pulse widths, by virtue of the control and operation of transistor 71 in timed relationship with the action of multi-vibrator 24. Considering the precision and constantancy of operation obtained, the apparatus still is comparatively simple both in terms of fabrication and of its manner of adjustment.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:
1. Apparatus permitting incremental and accurate control of the speed of a motor comprising:
   a unidirectional motor;
   a source of power for said motor;
   means coupled to said source for supplying said power to said motor and including astable multi-vibrator means responsive only to itself for repetitively interrupting the supply of said power for selectively-adjustable time intervals, said interrupting means, upon the occurrence of each interruption, in itself being effective to complete the act of interruption of said supply only in a finite period of time;
   and means, triggered by said interrupting means, responsive to each interruption of said power by said interrupting means for decreasing to a minimum the period of time in which said act of interruption is completed, said decreasing means restoring itself after the completion of each interruption to a condition ready to respond to the next interruption by said interrupting means.

2. Apparatus as defined in claim 1 in which said interrupting means includes:
   a first electric valve repetitively changing between conduction and non-conduction states in correspondence with and initiating said interruptions, with said interruptions having a substantially constant mean frequency;
   an energy-storage means coupled to said valve, exhibiting changes in said stored energy level in response to said changes in said states and establishing the length of said time interval in correspondence with its level of stored energy, said decreasing means being coupled to said energy-storage means.

3. A system as defined in claim 2 in which said decreasing means includes a second electric valve activatable in response to the occurrence of a change in the conduction state of said first valve for altering the effective level of said stored energy.

4. Apparatus as defined in claim 3 in which said decreasing means further includes means responsive to the alteration of said level for deactivating said second valve subsequent to the activation thereof and prior to the next occurrence of a change in the conduction state of said first valve.

5. Apparatus as defined in claim 4 in which said decreasing means further includes means, together with said second valve and said alteration-responsive means, constituting a multi-vibrator responsive to said conduction state change to activate said second valve and subsequent thereto to again deactivate said second valve.

6. Apparatus as defined in claim 2 in which said astable multi-vibrator means includes a source of adjustable-level constant current to said storage means, the level of said current governing the length of said time intervals.

7. Apparatus as defined in claim 6 in which said multi-vibrator includes second energy storage means, said current source also feeds current to said second energy storage means and in which the differential between the current level respectively fed to said energy-storage means governs the length of said time interval.

8. Apparatus as defined in claim 2 in which said interrupting means includes means, together with said first valve and said energy storage means, constituting said astable multi-vibrator governing the periodicity of said interruptions;

and in which said decreasing means includes a monostable multi-vibrator activated in response to the occurrence of each one of the interruptions and self-deactivating each time prior to the occurrence of the next successive interruptions.

9. Apparatus as defined in claim 2 in which said energy-storage means includes an impedance conductive of current to develop control pulses the width of which is determined by the length of said time intervals and the decrease of said period of time.

10. Apparatus as defined in claim 9 in which said interrupting means further includes another electric valve coupled to said impedance and conductive of current to said motor from said source in response to said control pulses.

11. Apparatus as defined in claim 9 in which said decreasing means is coupled to said impedance and is effective upon each of said interruptions to conductively short said impedance.

12. Apparatus as defined in claim 2 in which said interrupting means includes an electric valve responsive to said multi-vibrator and which supplies current from said source to said load and effects said interruptions.

13. Apparatus as defined in claim 1 in which said astable multi-vibrator means is selectively adjustable to control the length of said time interval while maintaining substantially constant the mean frequency of said interruptions.

14. Apparatus as defined in claim 13 in which said power is in the form of successive uni-polarity half-cycles of current having generally sinusoidal variations in amplitude, and said interrupting means, together with said decreasing means, supply said power in the form of a plurality of segments of said half-cycles.

15. Apparatus as defined in claim 13 in which said interrupting means is energized from said source and includes means responsive to an increase in the potential of said source for increasing the length of said time intervals.

16. Apparatus as defined in claim 13 in which said interrupting means is energized from said source and includes means responsive to an increase in the potential of said source for decreasing the time between said intervals.

17. Apparatus as defined in claim 16 in which said responsive means also increases the length of said time intervals.

References Cited

UNITED STATES PATENTS

| | | | |
|---|---|---|---|
| 2,900,606 | 8/1959 | Faulkner | 331—113 |
| 3,183,366 | 5/1965 | Brode | 331—113 |
| 3,400,337 | 9/1968 | Sherlin | 331—113 |
| 3,446,992 | 5/1969 | Barniskis et al. | 318—341 |

ORIS L. RADER, Primary Examiner

T. LANGER, Assistant Examiner